United States Patent [19]
Brook

[11] 3,943,081
[45] Mar. 9, 1976

[54] STABILIZERS FOR POLYVINYL CHLORIDE

[75] Inventor: John W. Brook, Plainfield, N.J.

[73] Assignee: Claremont Polychemical Corporation, Roslyn Heights, N.Y.

[22] Filed: July 2, 1974

[21] Appl. No.: 485,180

[52] U.S. Cl. 260/23 XA; 252/400 A; 260/45.75 W; 260/45.7 P; 260/45.95 R
[51] Int. Cl.² ............................................. C08J 3/20
[58] Field of Search 260/45.75 W, 23 XA, 45.95 R, 260/45.7 P; 252/400 R

[56] References Cited
UNITED STATES PATENTS

| | | | |
|---|---|---|---|
| 3,558,537 | 1/1971 | Hecker | 260/23 XA |
| 3,674,730 | 7/1972 | King | 260/45.75 W |
| 3,759,856 | 9/1973 | Rhodes et al. | 260/23 XA |

*Primary Examiner*—V. P. Hoke
*Attorney, Agent, or Firm*—E. Janet Berry; Lawrence Rosen

[57] ABSTRACT

This invention comprises use of polyvinyl resin stabilizers, or alkaline earth metal soap and/or phenolate complexes or solutions with soluble zinc chloride and hydroxy compounds (or other suitable solutions of zinc chloride) and organophosphites. These combinations have not previously been used for this purpose.

33 Claims, No Drawings

STABILIZERS FOR POLYVINYL CHLORIDE

This invention relates to new compositions of matter and more particularly to compositions adapted for stabilizing halogenated hydrocarbon polymers against the degradative effects of heat and/or light.

More particularly, the present invention relates to new and novel compositions of matter whereby selected chemical compounds, when added to vinyl resin compositions in critical proportions relative to each other, result in a degree of heat stabilization of the resin which is far superior to any individual contribution if each were incorporated singly. In other words, a synergistic effect is obtained with respect to heat stabilization.

Since halogen containing vinyl resins have assumed a major and dominant position at both the consumer and industrial levels, and a major proportion of these resins being marketed are presently stabilized against the degradation effects of heat and/or light by using very toxic compositions, solutions and complexes of both barium and cadmium, it is important to discover and make available equally useful substitutes of low toxicity. Both strontium and zinc complexes are materials which can readily be used to stabilize polyvinyl chloride and other halogenated compounds against the well-known degradative effects. Derivatives of both these two materials are of relatively low toxicity.

It is an object of this invention to provide stabilizing agents for halogenated hydrocarbon polymers using alkaline earth metals in combination with zinc chloride and selected hydroxyl containing compounds.

A further object of the invention is to provide stabilizing agents for halogen-containing vinyl resins which are resistant to sulfur staining.

A still further object of the present invention is to provide stabilizing agents which are useful when used in the presence of fluorescent pigments since these pigments presently require special stabilizing systems.

Broadly stated this invention comprises new compositions of matter in which there are incorporated certain organic acid compounds of the alkaline earth metals from Group IIA of the Standard Periodic Chart and principally strontium, with liquid complexes produced by combining zinc chloride and certain organic hydroxyl-containing substances, such as 1,3-butylene glycol and organophosphites, such as diphenyl decyl phosphite.

Plasticized, chloride-containing vinyl resins, for instance homopolymer polyvinyl chloride, are conventionally stabilized against the degradative effects of heat and light with toxic solutions containing, among other necessary materials, barium and cadmium soaps, salts, phenolates or benzoates, sometimes referred to as "barium-cadmium complexes". Essentially low toxicity stabilizer solutions can be achieved and successfully used in polyvinyl chloride resins in which are incorporated a strontium phenolate-soap complex, a zinc chloride-diol complex, and organophosphites.

The present invention, to be described in detail below, pertains to a related series of chemical solutions containing solubilized metal compounds, organophosphites, certain hydroxy compounds and certain specific synergistic antioxidants in compatible solvent systems.

While cadmium is acutely, chronically and cumulatively toxic, barium is only to be described as acutely toxic, and is not cumulative nor chronically toxic. However, its elimination from vinyl resin stabilizer system, along with cadmium creates a "low toxicity" stabilizer system provided the other required objectives for a stabilizer are obtained, e.g., good early color and color control, together with good long term stability, clarity, plate-out resistance, ultraviolet light resistance and low cost.

Strontium soaps or strontium-zinc soaps have been known for a long time, i.e., a solid or powdered strontium-zinc soap, which is used occasionally as at least a partial replacement for barium-cadmium soaps to improve sulfide stain resistance and which can also be used in polyvinyl chloride resins containing fluorescent pigments which are ordinarily adversely affected by standard barium-cadmium complex stabilizers.

The strontium-complexed zinc stabilizer system of the invention, if the metals and phosphite are used in controlled quantities, can be used almost universally and in any application and formulation in which a standard barium-cadmium stabilizer is used, e.g., with or without fillers such as calcium carbonate, in clear polyvinyl chloride resins with all colors and dyes, and in any forming process, such as extrusion, calendering, and plastisol-organosol applications such as coating and dipping.

The advantages achieved by use of the invention are entirely unexpected since in the prior art of polyvinyl chloride resin stabilization the use of either too much zinc, such as the 2-ethylhexanoate, para-t-butylbenzoate or stearate, and especially as the chloride, would cause catastrophic degradation when the thus stabilized polyvinyl chloride resin was exposed to temperatures of 340°–420°F. In accord with this invention, the high activity of zinc chloride is modified and controlled by its solution and/or complexation in a hydroxyl-containing liquid, and thus it is a valuable low toxicity, cheap component in these stabilizer systems.

One principal improvement which has thus been achieved in heat stabilization of polyvinyl chloride is the general lowering of toxicity of the stabilizer system. The comparison is between the conventionally used barium-cadmium-zinc-phosphite, a highly toxic solution, to a relatively low toxicity strontium-zinc-hydroxyl-containing liquid-phosphite solution. It has also been found that color control is improved, as well as is the very important property of plate-out resistance which is improved by the omission of cadmium from the normal barium-cadmium or barium-cadmium-zinc complex solutions.

More specifically, typical ingredients useful in the stabilizing compositions of this invention adapted for use in halogen-containing vinyl resin formulations are the following combinations:

1. Sr, Ca and/or Mg aliphatic carboxylates, phenolates, benzoates, alkyl benzoates or mixed acid compound(s)
2. Zinc chloride complex or solution of zinc chloride with primary and secondary alcohols, glycols, secondary phosphites, and glycol ethers, substituted triols and glycols
3. Organophosphite(s) (both di and tri)
4. Solvents and solubilizing agents for each of the above, both separately and as mixtures, such solvents being generally known and used for incorporating stabilizers into polyvinyl chloride.

As for the first above listed ingredient, Ba can be used although it should be realized that its inclusion will create a more toxic stabilizer composition, but yet having lower toxicity than a typical Ba/Cd complex known stabilizer.

The organic acids and phenols which can be used in preparing the alkaline earth metal compounds of (1) above may be one or more of the following: hexanoic acid, 2-ethyl hexanoic acid, heptanoic, octanoic acid, decanoic acid, nonanoic acid, undecylenic acid, undecanoic acid, benzoic acid, para t-butyl benzoic acid, and maleic acid half-esters, as well as phenol, octyl phenol, nonyl phenol, and dodecyl phenol.

The zinc chloride complex or solution of (2) above may be prepared by dissolving zinc chloride in and complexing it with various alcohols, glycols and other liquid hydroxy materials, such as: ethyl alcohol, propanol, amyl alcohol, isooctyl alcohol, 2-octanol, decyl alcohol, dodecyl alcohol, cyclohexanol, dipropylene glycol, tripropylene glycol, ethylene glycol, propylene glycol, 1, 3-butylene glycol, glycerol monoricinoleate, sorbitan monooleate, butyl ricinoleate, butyl lactate, dibutyl malate, tributyl citrate, glycerol, ethylene glycol monobutyl ether, 2-ethyl-1, 3-hexanediol, diphenyl phosphite, phenyldecyl phosphite, didecyl phosphite, di (octylphenyl) phosphite, and other similar secondary phosphites. Thus the types of hydroxy-containing compounds which can be used include the aliphatic alcohols $C_2$ to $C_{15}$, both primary and secondary, aliphatic esters having primary, secondary and tertiary hydroxy groups, alicyclic hydroxy compounds and various polyols, i.e. diols and triols.

The organophosphites which may be used are generally known compounds and include the following di and tri phosphite compounds: triphenyl phosphite, diphenyldecyl phosphite, didecylphenyl phosphite, diphenyloctyl phosphite, diphenyl phosphite, phenyldecylphosphite, tricesyl phosphite, cresyldioctyl phosphite, tris(nonylphenyl) phosphite, trioctyl phosphite, phenyl neopentyl phosphite, and the like.

The solvents and solubilizing agents used for dissolving each of the ingredients, and also keeping them in solution, are generally the same or similar to those which are in use, namely mineral spirits, naphtha, mineral oil, and heavy petroleum oil fractions, the solvating agents being of a proprietary nature, but including such solvents as octyl alcohol.

Certain useful and preferred ranges and proportions of ingredients have been established by a study of the various materials used in the stabilizer composition of the invention. These ranges may be summarized as follows:

In general and for best results, it is best to prepare the stabilizers using the aforesaid ingredients in these ranges.

It has been found that the tertiary phosphites are necessary for the best color results., i.e., color control during heat processing of polyvinyl chlorides containing the stabilizing components of the invention plus tertiary phosphites is maximized.

Also, it is necessary that an epoxy oil such as epoxydized soyabean oil or epoxydized ester, or liquid epoxy resin be included with the stabilizers of the present invention in order to obtain adequate heat stability.

The described stabilizers of this invention can be used in polyvinyl halide resins, both homopolymers and copolymers of the vinyl halide with certain order monomers such as methyl methacrylate, butyl acrylate, acrylonitrile, styrene, $\alpha$-methylstyrene, and other vinyl monomers, including vinyl acetate, propylene and ethylene.

The principal polymer used in connection with the present invention is, of course, polyvinyl chloride. However, other halogen-containing polymers such as polyvinylidene chloride, chlorinated polyethylene and chlorinated polypropylene can be successfully stabilized with the zinc chloride containing compositions of the invention.

Stabilizers of the type described are used to inhibit successive dehydrohalogenation and subsequent oxidation of the resulting polyene chain such that six or more conjugated double bonds may form in the absence of said stabilizers, or those presently used such as the commonly used barium nonylphenate/cadmium carboxylate/zinc carboxylate and mixed alkyl-aryl phosphites, or others such as the calcium/zinc carboxylates, the mono-and dialkyl tin carboxylates or mercaptoesters, or the lead compounds such as basic lead sulfate or phthalate.

Polyvinyl chloride homopolymer or vinyl copolymers can be formed in various known ways, among which are suspension, emulsion, and mass or bulk polymerization procedures. Both suspension and mass polymerization methods produce polyvinyl chloride used in the calendering, extrusion and molding of both flexible, semi-rigid and rigid polyvinyl chloride, whereas polyvinyl chloride resin produced via the emulsion route is used to make plastisol and organosol pastes which are used in dip, roller and spread coating, along with rotational coating procedures and in vinyl inks.

It is in the high heat processing of homopolymer polyvinyl chloride or copolymers during which the heat

|  | Useful Amts. Range, phr. | Preferred Amts. Range, phr. |
|---|---|---|
| Sr, Ba, Ca, Mg in form of aliphatic carboxylate, phenolate, benzoate, alkylated acid or phenolates, or mixed acid compounds | 0.03 to 0.3 | 0.06 to 0.15 |
| Zinc Chloride | 0.005 to 0.30 | 0.03 to 0.10 |
| Alcohol, glycol, polyhydroxy or other (OH) compound used to dissolve and complex the $ZnCl_2$ | 0.01 to 1.0 | 0.06 to 0.40 |
| Tertiary & Secondary Organo-phosphite ester(s) | 0.00 to 5.0 | 0.2 to 1.0 |
| Solvents and solubilizing agents | as found necessary | as found necessary |
|  | Useful Wt. Ratio | Preferred Wt. Ratio |
| Strontium/ $ZnCl_2$ | 1/1 to 4/1 | 1.5/1 to 2.5/1 |
| $ZnCl_2$ / (OH) cmpd. | 2/1 to 1/20 | 1/2 to 1/4 | stabilizers are required, simply to slowdown the various degradation steps which degrade polyvinyl chloride or other polymers containing halogens, which cause color drift, early darkening, embrittlement and other undesirable characteristics.

It is also known that the use of standard commercial proprietary heat stabilizers can cause other undesirable effects, such as clarity loss, plate-out on calendering rolls and molding equipment, and other incompatability effects such as migration to the surface. The standard stabilizers are usually designed and compounded to minimize these undesirable effects.

Polyvinyl chloride, being a halogen-containing polymer, is not particularly resistant to ultraviolet light, such as from the rays of the sun. Certain stabilizers, such as the mercaptoesters of alkyltin cause UV light to attack polyvinyl chloride even more rapidly. Again, the barium-cadmium and barium-cadmium-zinc stabilizers of today's technology are made to maximize resistance to sunlight when desirable to do so.

Heat stabilizers are used as liquids, powders or pastes. The liquids can contain 100% active ingredients, as is the case of the alkyltin products, or may contain diluents as in the case of the common barium-cadmium type of products. Powders and pastes are generally 100% active. The less-than 100% active barium-cadmium and barium-cadmium-zinc stabilizer liquids of the prior art are dissolved in a system of high boiling liquids, among which are mineral spirits, naphtha and isooctyl alcohol. The stabilizers of the present invention can also make use of the same solvents and solvent systems, but also can make use of other, less common solvents such as high boiling glycols and many proprietary solvent systems.

The following examples are presented solely to illustrate the various embodiments of the invention, but are intended in no way to restrict the scope of the invention to these examples. The parts and percentages set forth in the Test Procedures and Examples are by weight:

TEST PROCEDURES

The polyvinyl chloride formulation which was used in the Examples of the invention was as follows:

| Ingredients | Parts by Weight |
|---|---|
| Vinyl chloride homopolymer (PVC) | 100.0 |
| Di(2-ethylhexyl)phthalate (DOP) | 40.0 |
| Epoxidized soyabean oil (ESO) | 5.0 |
| Calcium carbonate filler (trade name Atomite) | 35.0 |
| Stearic Acid (lubricant) | 0.5 |
| Stabilizer solution | 3.0 |

To evaluate both positive and negative aspects of various stabilizer combinations, the PVC compounds prepared according to the Test Procedures and Examples were processed by milling on an open two-roll laboratory mill at 330°F. at a roll gap of about 0.025–0.030 inch for a period of 5 minutes, the sheet obtained taken off the mill at 0.025 inch thickness. Six one-square inch chips (or smaller size) were cut from the above sheets, placed on a glass plate, then heat-aged in an air-circulating oven at 400°F. for varying periods of time to study resistance to degradation. Samples were removed from the oven every 10 minutes for up to one hour. During heat exposure, the degradation of the chips was noted as demonstrated by a darkening in color, the more efficient stabilizers furnishing the best color retention (high degradation resistance) and the longest stability until ultimate degradation results after prolonged periods of testing time.

Clarity tests were performed on a similar PVC formulation, but without the filler present. The test involved the preparation of a compression molded plaque of 0.100 inch thickness prepared between two mirror-polished plates. Results were obtained by visually observing the differences in clarity.

Another test used was a mill stability test in which the sheet was allowed to remain on the 340°F. mill until sticking on the mill surface was noted and/or a considerable darkening in color was obtained.

Another test used was the Brabender Plastograph torque rheometer evaluation. This test has become a standard in the PVC industry for the determination of melt rheology and dynamic stability. To carry out this test, a 55.0 gram charge of the aforementioned milled PVC sheet was added, in strips, to a 60 ml. bowl preheated to 370°F., the bowl containing two rotors, rotating in opposite directions and at slightly different speeds (similar to a miniature Banbury mixer, used in commercial operations), and averaging about 70 RPM. The stability and rheology of the samples was followed by removing small ½ × ¼ inch chips using a pair of duck-billed pliers. Both color degradation and time period to ultimate degradation, as noted by a sudden increase in viscosity, are easily obtained in this manner.

EXAMPLE 1

20% Zinc chloride complex

Into 800 gm of 1, 3-butylene glycol in a beaker maintained at 80°C. there was added and mixed 200 gm. of anhydrous technical grade zinc chloride. Mixing proceeded for about 2 hours until complete solution indicating the zinc chloride was totally complexed, as evidenced by no crystallization on cooling to low temperature (− 17°C.).

| Theoretical % Zn | = 9.6% |
|---|---|
| Actual % Zn | = 9.6% |

EXAMPLE 2

52% Strontium 2-ethyl hexoanoate/nonylphenate

Into a 5000 ml round-bottom flask equipped with a stirrer, thermometer, Dean-Stark water trap, water-cooled condenser and heating mantle there were added the following ingredients:

| Ingredient | Parts |
|---|---|
| Mineral Spirits | 200 |
| High-flash naphtha | 500 |
| Tripropylene Glycol | 146 |
| 2-ethylhexanoic acid | 289 |
| Nonylphenol | 462 |
| Strontium octahydrate | 548 |

The active ingredients were allowed to react with the water being stripped off by azeotropic distillation (final last amount being removed by vacuum), at 200°–280°F for 7 hours, followed by collecting 1,573 gm, after vacuum filtration of sediment, of viscous orange liquid with a strontium assay of 10.3%.

EXAMPLE 3

Use of Samples from Ex. 1 and Ex. 2 vs. Ba/Cd stabilizer solution

A series of four PVC compounds was prepared using the filled formulation described in the Test Procedures and the four individual stabilizer solutions prepared as indicated below (A, B, C and D). A 400°F. oven stability evaluation was run, the results of which are listed below for each individual stabilizer.

| Components | % by weight Sample No. | | | |
|---|---|---|---|---|
| | A | B | C | D |
| Barium 2-ethyl hexanoate nonylphenate solution (10% Ba, similar to Ex. 2) | 61 | 61 | — | — |
| Strontium complex (Ex. 2) | — | — | 39.4 | 39.4 |
| Cadmium 2-ethyl hexanoate solution (15% Cd) | 10 | — | — | — |
| Zinc Chloride Complex (Ex. 1) | — | 8 | 6 | 5 |
| Zinc 2-ethyl hexanoate solution (14.6% Zn) | 0.7 | — | — | — |
| Triphenyl Phosphite | 11 | 11 | 11 | 11 |
| Diphenyldecyl Phosphite | 13 | 13 | 13 | 13 |
| Solvents | 4.3 | 7 | 30.6 | 31.6 |
| RESULTS: PVC Sheet Color | 2 | 3 | 2 | 2 |
| Oven-degraded chip colors: | | | | |
| 10 min. | 3 | 5 | 4 | 3 |
| 20 min. | 5 | 5 | 4 | 4 |
| 30 min. | 7 | 6 | 6 | 6 |
| 40 min. | 8 | 7 | 7 | 8 |

Color Legend (Opaque)

1 = White
2 = Off-White
3 = Faint Yellow
4 = Light Yellow
5 = Yellow
6 = Yellow-to-Orange
7 = Darker Yellow-Orange
8 = Orange These experimental results clearly show that the stabilizers of the present invention, No. B, C, and D above identified, are approximately equivalent in their effect on PVC degradation as the relatively standard Ba/Cd system of No. A.

EXAMPLE 4

Comparative Stabilizers used in Plastisol and Calendered Formulations

Two different stabilizers of the present invention, each containing the strontium complex of Ex. 2, as described above, an alkyl aryl phosphite, and a zinc chloride-secondary phosphite complex were used successfully to stabilize flame retardant PVC compositions, one being a plastisol paste system for coating, the second composition being one to form on a calender.

| Formulation P (Plastisol) | | Formulation C (Calender) | |
|---|---|---|---|
| | Parts by Weight | | Parts by Weight |
| Polyvinyl chloride resin | 100 | Polyvinyl chloride resin | 100 |
| Organic Phosphate | 35 | Phthalate diester | 25 |
| Phthalate diester | 35 | Organic Phosphate | 25 |
| 2-Ethylhexyl Epoxy Tallate | 7 | Epoxy Soyabean Oil | 5 |
| Calcium Carbonate Filler | 14 | Antimony Oxide | 2 |
| Titanium Dioxide | 2 | Titanium Dioxide | 5 |
| Stabilizer Solution | 4 | Stearic Acid (Lub.) | 0.5 |
| | | Stabilizer Solution | 3 |

The stabilizer of this invention used in Formulation P was comprised of the following materials:

| | % by weight |
|---|---|
| Strontium complex solution of Ex. 2 above | 34.1 |
| Didecylphenyl Phosphite | 34.2 |
| Zinc chloride-Diphenyl Phosphite Complex, 12.2% Zinc (similar to Ex. 1) | 10.6 |
| Oleic Acid | 6.0 |
| Solvents & Coupling agents | 18.1 |
| | 100.0 |

The stabilized PVC plastisol was drawn down at a thickness of 0.020 inch on a glass plate, gelled at 350°F for 5 minutes, cut into small 1 and 2 inch pieces and subjected to oven aging in a forced-draft oven maintained at 370°F, removing pieces at 5-minute intervals. The resulting colored chips were discolored according to the degree of heat aging of each; the darker chips being heat aged for the longer periods. In comparison to a commercial stabilizer for this purposes, the stabilizer of this invention was superior as shown here: (U = unchanged)

| Time | 0' | 5' | 10' | 15' | 20' | 25' | 30' |
|---|---|---|---|---|---|---|---|
| Stabilizer of this Invention | White | U | U | Faint Yellow | Slightly Yellow | Light Yellow | Orange |
| Commercial stabilizer (Ba - Cd - Zn - P) | White | U | U | Faint Yellow | Yellow | Bright Yellow | Orange |

The % of metals contained in the two products, as analyzed, were these:

| | Ba | Sr | Cd | Zn | P |
|---|---|---|---|---|---|
| Stabilizer of This Invention | 0 | 3.20 | 0 | 1.30 | 2.40 |
| Commercial stabilizer (Ba - Cd - Zn - P) | 4.9 | 0 | 2.4 | 0.60 | 2.40 |

The second PVC composition, Formulation C, incorporated a different stabilizer, using the technology of the present invention, and was comprised of these materials:

| | % by weight |
|---|---|
| Strontium stabilizer of Ex. 2 above | 39.50 |
| Diphenyl Decyl Phosphite | 47.15 |
| Zinc chloride-Diphenyl Phosphite Complex, 12.2% Zinc (Similar to Ex. 1) | 8.15 |
| Solvents & Coupling Agents | 5.20 |
| Total | 100.00 |

The stabilized PVC Formulation C was evaluated according to the standard procedure except that the oven temperature was 380°F. It was shown that 3 phr of the stabilizer above of this invention, was generally equivalent in oven heat stability results to a commercial Ba - Cd - Zn - P product, the analyses being given here:

| | Ba | Sr | Cd | Zn | P |
|---|---|---|---|---|---|
| Stabilizer of this Invention | 0 | 4.07 | 0 | 1.0 | 3.92 |
| Commercial stabilizer (Bn - Cd - Zn - P) | 3.5 | 0 | 1.85 | 0.5 | 2.8 |

The information and data above clearly shows that flame retardant PVC compositions, both plastisol and calendered formulations, can be successfully stabilized against the degradative effects of heat using the strontium-zinc chloride solution and/or complex technology of this invention.

EXAMPLE 5

Dynamic Mill Stability and Brabender Results (Ba/Cd vs. Sr/ZnCl₂) Containing Samples A series of two samples were tested, the PVC compounds being prepared by using the stabilizer solutions identified below and tested using the two procedures outlined before Example 1. The mill temperature on the surface was 340°F. and the Brabender bowl temperature was 375°F.

| Components | % by weight A | B |
|---|---|---|
| Barium 2-ethyl hexanoate nonylphenate solution, (10% Ba, similar to Ex. 2) | 61 | — |
| Strontium Complex (Ex. 2) | — | 39.4 |
| Cadmium 2-ethyl hexanoate solution (15% Cd) | 10 | — |
| Zinc Chloride Complex (Ex. 1) | — | 6 |
| Zinc 2-ethyl hexanoate solution (14.6% Zn) | 0.7 | — |
| Triphenyl Phosphite | 11 | 11 |
| Diphenyldecyl Phosphite | 13 | 13 |
| Nonylphenol | — | 11 |
| Solvents | 4.3 | 19.6 |

| RESULTS: | | A | B |
|---|---|---|---|
| Mill Stability Chip Colors: | | | |
| | 5 min. | 2 | 2 |
| | 10 min. | 2 | 2 |
| | 20 min. | 3 | 3 |
| | 40 min. | 5 | 3 |
| | 60 min. | 6 | 4 |
| | 80 min. | 8S | 5 |
| | 90 min. | | 6 |
| | 100 min. | | 7 |
| | 120 min. | | 8S |
| Brabender Colors (Chips): | | | |
| | 10 min. | 3 | 4 |
| | 20 min. | 4 | 4 |
| | 30 min. | 5 | 5 |
| | 40 min. | 6 | 6 |
| | 45 min. | 6 | 6 |
| | 50 min. | 7 | 7 |

Color Legend (Opaque):
1 = White
2 = Off-White
3 = Faint Yellow
4 = Light Yellow
5 = Yellow
6 = Yellow-to-Tan
7 = Darker Yellow-Tan
8 = Light Brown
S = Sticks to Mill These results are unexpected and surprising in that they show quite vividly that the Sr/ZnCl₂ complex solution is superior to the more standard Ba/Cd systems as represented in Sample A above, especially in dynamic mill stability. The Brabender results show that the stabilizers and complexes of this invention are fully equal in stability to the standard conventional Ba/Cd stabilizer systems.

EXAMPLE 6

Use of Zinc Salts Other than Zinc Chloride

Stabilizers were also prepared with zinc salts other than zinc chloride, one with zinc bromide and the other with zinc nitrate, and each tested against one prepared using zinc chloride. Butylene glycol-1, 3 was used as the solvent for the zinc salt in each case. The approximate limiting concentration of the zinc was highest for the chloride (12%), lowest for the nitrate (7.2%), and intermediate for the bromide (9.1%), showing the relative complexing strength of the salts. The individual stabilizer solutions each contained the same amount of zinc, 1.09%, the salt solutions being prepared in similar manner to Example 1. The other materials used in preparing the stabilizers were these:

| | % by Weight | |
|---|---|---|
| Strontium complex of Example 2 | 24.3 | |
| Nonyl Phenol | 10.0 | |
| Diphenyldecyl phosphite | 24.0 | |
| Solvents, other than 1, 3-butylene glycol | 32.6 | with Zn chloride |
| | 29.8 | with Zn bromide |
| | 27.6 | with Zn nitrate |

The evaluation in polyvinyl chloride homopolymer compound was run in the same system as described in the Test Procedures above with the exception that no calcium carbonate filler was used, and the colors obtained were compared with the Gardner color scale, Series 1953, with a 0 rating being colorless, 5 being light yellow, 10 being orange-yellow, and 18 being dark reddish-orange, and 20 being totally black.

The oven test temperature was 380°F., and a set of test pieces were removed every 10 minutes.

|  |  | Chloride | Bromide | Nitrate |
|---|---|---|---|---|
| Color of Press Plaque |  | 2 | 5 | 3 |
| Clarity of Pressed Plaque against White light and black paper |  | Clear | Clear | Clear |
| Oven results: Color | 10 Min. | 1 | 4 | 2 |
|  | 20 Min. | 2 | 5 | 4 |
|  | 30 Min. | 4 | 6 | 6 |
|  | 40 Min. | 9 | 20 | 8 |
|  | 50 Min. | 20 | 20 | 10 |

In these experiments it is seen that the bromide is somewhat inferior to the chloride. The nitrate also gave poorer color but may be useful as a possible zinc source in the stabilizers of the invention because its long term stability was found to be superior.

It also was found that zinc fluoride was not useful in similar manner as it did not dissolve in the glycol. It was also found that when tested as a solit it gave poorer results as to color than did the bromide. It also gave poor clarity results against a background of white light.

EXAMPLE 7

Zinc Chloride Complexes Prepared with Hydroxy Materials other than 1,3-Butylene Glycol The compound of Example 1 was prepared from zinc chloride and 1,3-butylene glycol, and the stabilizer Examples in Example 3, Example 4 and Example 5 were prepared with this complex/solution. Studies were conducted on the possibility of using hydroxycontaining materials other than 1,3-butylene glycol.

The following materials were used to dissolve or complex with zinc chloride, and the solutions used to prepare polyvinyl chloride resin stabilizers similar to those of Example 3 shown above.

a. 1, 3-butylene glycol, 12% Zn
b. isooctyl alcohol, 11.8% Zn
c. ethylene glycol monobutyl ether (Butyl Cellosolve), 13.8% Zn
d. Diphenyl phosphite, 11.6% Zn
e. phenylisodecyl phosphite, 6.8% Zn
f. mixed dodecyl-Tetradecyl alcohols (Alfol 1214), 10.6% Zn In like manner other hydroxyl-containing organic reagents can be used to dissolve zinc chloride; these compounds include:
2-octanol
butyl ricinoleate
butyl lactate
butyl malate
tributyl citrate
cyclohexanol
glycerol

EXAMPLE 8

Comparative Results Obtained with and without the Organophosphite

Below is described the testing of two comparative resin samples, one of which contains an organophosphite and the other does not. The polyvinyl chloride resin formulation, processing and evaluation was carried out in the same manner as in the Test Procedure above described except that the oven temperature was 380°F., and no calcium carbonate filler was used. Also, the heat-aged chips were color evaluated in the same manner as described in Example 5. It can plainly be seen that the sample which contains phosphite shows the far superior color.

|  |  | A | B |
|---|---|---|---|
| Strontium - 0.07 phr, as Example 2 cmpd. |  | x | x |
| Zinc chloride - 0.07 phr, as complex with Diphenyl Phosphite containing 12.2% Zn |  | x | x |
| Diphenyldecyl phosphite - 0.50 phr |  | x | 0 |
| Results: Color of Pressed Plaque |  | 1 | 1 |
| Oven test: Color | 10 Min. | 1 | 2 |
|  | 20 Min. | 2 | 6 |
|  | 30 Min. | 3 | 7 |
|  | 40 Min. | 8 | 20 |

EXAMPLE 9

Synergistic Activity

The formulation, processing and comparative evaluation were carried out in the same manner as described in the Test Procedures except that the oven temperature was 380°F. and no calcium carbonate filler was used. The heat-aged resin chips were color evaluated in the same way as in Example 5. A few examples were prepared in the absence of epoxy soyabean oil.

| Ingredients |  | A | B | C | D | E | F | G | H | I | J |
|---|---|---|---|---|---|---|---|---|---|---|---|
| Sr. - 0.07 phr, as in Example 2 |  | x | x | O | x | x | x | x | O | O | O |
| ZnCl$_2$ - 0.07 phr, as powder |  | O | x | O | O | O | O | O | O | O | O |
| Diphenyl phosphite - 0.2 phr |  | O | x | O | O | O | O | O | O | O | x |
| Diphenyl decyl phosphite - 0.50 phr |  | x | x | x | x | O | x | O | O | O | x |
| ZnCl$_2$-diphenyl phosphite complex - 0.07 phr ZnCl$_2$ - 0.2 phr DDP |  | x | O | x | O | x | x | O | x | O | O |
| Epoxy soyabean oil - 5.0 phr |  | x | x | x | x | x | O | O | O | x | O |
| Results: Color of Pressed Plaque |  | 1 | 1 | 1 | 5 | 1 | 1 | 11 | 20 | 2 | 12 |
| Oven Test - Color | 10 Min. | 1 | 3 | 2 | 10 | 2 | 20 | 12 | 20 | 10 | 12 |
|  | 20 Min. | 2 | 5 | 4 | 13 | 6 | 20 | 12 | 20 | 13 | 16 |
|  | 30 Min. | 3 | 19 | 19 | 13 | 7 | 20 | 16 | 20 | 14 | 18 |

-continued

| Ingredients | | A | B | C | D | Sample No.<br>E | F | G | H | I | J |
|---|---|---|---|---|---|---|---|---|---|---|---|
| | 40 Min. | 8 | 20 | 20 | 13 | 20 | 20 | 16 | 20 | 14 | 18 |

Only six of the 10 samples tested and results reported above show very good pressed plaque color, only one of the six being prepared without zinc chloride being present. Only four examples show good color (light yellow or yellow) through 20 minutes in the oven test, each of these samples containing both zinc chloride and epoxy soyabean oil. Only one run showed both good color and good oven heat stability (30–40 minutes), and this run was Sample A, having present the composition of the present invention. Sample B, prepared from the individual components of the zinc-secondary phosphite complex, showed poorer color properties and much poorer oven heat stability than Sample No. A from the complete complex itself. Also, Sample C (without Sr), D (without zinc complex), E (without tertiary phosphite), and F (without epoxy compound), each of which were prepared in the absence of a critical material or ingredient of the invention gave much inferior results to the Sample A which contained each of the critical materials. Also, Samples G, H, I, and J, containing only one of the critical materials of the invention, showed far inferior results.

Using the above examples, it can be said that synergistic stabilizing activity is obtained by using the critical ratios and levels of strontium 2-ethyl-hexanoatenonylphenate, zinc chloride-hydroxy complex, tertiary phosphite and epoxy compound.

What is claimed is:

1. A stabilizer composition especially adapted for use as a stabilizer for halogenated hydrocarbon resins which consists essentially of at least one alkaline earth metal salt of an organic acidic compound selected from the group consisting of organic carboxylic acids and phenols, zinc chloride dissolved in an organic hydroxyl containing compound, at least one organophosphite and at least one inert organic solvent therefor, the alkaline earth metal to zinc chloride ratio in the composition being from about 1 to 1 to about 4 to 1, and the zinc chloride to hydroxyl-containing compound being from about 2 to 1 to about 1 to 20.

2. The stabilizer composition of claim 1 especially adapted for stabilizing vinyl chloride resins.

3. The stabilizer composition of claim 1 especially adapted for stabilizing vinyl chloride homopolymers.

4. The stabilizer composition of claim 1 especially adapted for stabilizing vinyl chloride copolymers.

5. The stabilizer composition of claim 1 in which the alkaline earth salt is a strontium salt.

6. The stabilizer composition of claim 1 in which the organic acidic compound is an aliphatic acid.

7. The stabilizer composition of claim 1 in which the organic acid compound is a phenol.

8. The stabilizer composition of claim 1 in which the organic acid compound is a mixture of at least one aliphatic acid and at least one phenol.

9. The stabilizer composition of claim 1 in which the zinc chloride is dissolved in an aliphatic alcohol.

10. The stabilizer composition of claim 1 in which the zinc chloride is dissolved in a diol.

11. The stabilizer composition of claim 1 in which the zinc chloride is dissolved in a phosphite.

12. The stabilizer composition of claim 1 in which the zinc chloride is dissolved in a glycol ether.

13. The stabilizer composition of claim 1 in which the organophosphite is a diphosphite.

14. The stabilizer composition of claim 1 in which the organophosphite is a triphosphite.

15. The stabilizer composition of claim 1, in which the alkali earth salt is a strontium salt of an aliphatic acid, and zinc chloride dissolved in an aliphatic hydroxyl compound having at least one free hydroxy group.

16. A stabilized vinyl chloride resin composition which has incorporated therein at least one alkaline earth metal salt of an organic acidic compound selected from the group consisting of organic carboxylic acids and phenols, zinc chloride in solution in an aliphatic organic hydroxyl-containing compound and at least one organophosphite, the alkaline earth metal to zinc chloride ratio in the composition being from about 1 to 1 to about 4 to 1, and the zinc chloride to hydroxyl-containing compound being from about 2 to 1 to about 1 to 20, the stabilizer components in the resin composition being present in the amounts of 0.03 to 0.3 parts by weight of alkaline earth salt, 0.005 to 0.30 parts by weight zinc chloride, 0.01 to 1.0 parts by weight of organic hydroxyl-containing compound, and 0.00 to 5.0 parts by weight of organophosphite per one hundred parts by weight of vinyl chloride resin.

17. The stabilized vinyl chloride resin of claim 16 in which the vinyl chloride resin is a vinyl chloride homopolymer.

18. The stabilized vinyl chloride resin of claim 16 in which the vinyl chloride resin is a vinyl chloride copolymer.

19. The stabilized vinyl chloride resin of claim 16 in which the alkaline earth salt is a strontium salt.

20. The stabilized vinyl chloride resin of claim 19 in which an inert, non-reactive organic solvent is incorporated therein.

21. The stabilized vinyl chloride resin of claim 19 in which the aliphatic organic hydroxyl-containing compound is an aliphatic alcohol.

22. The stabilized vinyl chloride resin of claim 19 in which the aliphatic organic hydroxyl-containing compound is a diol.

23. The stabilized vinyl chloride resin of claim 19 in which the aliphatic organic hydroxyl-containing compound is a glycol ether.

24. The stabilized vinyl chloride resin of claim 19 in which at least one of the organophosphites is a diphosphite.

25. The stabilized vinyl chloride resin of claim 19 in which at least one of the organophosphites is a triphosphite.

26. A stabilizer composition for vinyl chloride resins which consists essentially of a strontium salt of a phenol, zinc chloride dissolved in an aliphatic organic hydroxyl-containing compound having at least one free hydroxyl group, at least one organophosphite, and at least one inert, non-reactive-organic solvent therefor, the strontium to zinc chloride ratio in the composition being from about 1 to 1 to about 4 to 1, and the zinc chloride to hydroxyl-containing compound being from about 2 to 1 to about 1 to 20.

27. A method of light and heat stabilization for vinyl chloride resins which comprises incorporating therein a composition consisting essentially of at least one alkaline earth metal salt of an organic acidic compound selected from the group consisting of organic carboxylic acids and phenols, zinc chloride dissolved in an organic hydroxyl containing compound, at least one organophosphite, and at least one inert, non-reactive solvent, the alkaline earth metal to zinc chloride ratio in the composition being from about 1 to 1 to about 4 to 1, and the zinc chloride to hydroxyl-containing compound being from about 2 to 1 to about 1 to 20, the stabilizer components in the resin composition being present in the amounts of 0.03 to 0.3 parts by weight of alkaline earth salt, 0.005 to 0.30 parts by weight of zinc chloride, 0.01 to 1.0 parts by weight or organic hydroxyl-containing compound, and 0.00 to 5.0 parts by weight of organophosphite per one hundred parts by weight of vinyl chloride resin.

28. The method of light and heat stabilization for vinyl chloride resins of claim 27 in which the alkaline earth metal salt is a strontium salt.

29. The method of light and heat stabilized for vinyl chloride resins of claim 27 in which the organic hydroxyl containing compound is an aliphatic alcohol.

30. The method of light and heat stabilization for vinyl chloride resins of claim 27 in which the organic hydroxyl containing compound is a diol.

31. The method of light and heat stabilization for vinyl chloride resins of claim 27 in which the organic hydroxyl containing compound is a glycol ether.

32. The method of light and heat stabilization for vinyl chloride resins of claim 27 in which the organophosphite is a diphosphite.

33. The method of light and heat stabilization for vinyl chloride resins of claim 27 in which the organophosphite is a triphosphite.

* * * * *